(12) United States Patent
Lu et al.

(10) Patent No.: US 6,172,609 B1
(45) Date of Patent: Jan. 9, 2001

(54) READER FOR RFID SYSTEM

(75) Inventors: Guiyang Lu, Upland; Michael F. Cruz, Corona; Peter Troesch, Norco, all of CA (US)

(73) Assignee: Avid Identification Systems, Inc., Norco, CA (US)

( * ) Notice: Under 35 U.S.C. 154(b), the term of this patent shall be extended for 0 days.

(21) Appl. No.: 09/423,761

(22) PCT Filed: May 14, 1998

(86) PCT No.: PCT/US98/10136

§ 371 Date: Feb. 14, 2000

§ 102(e) Date: Feb. 14, 2000

(87) PCT Pub. No.: WO98/52168

PCT Pub. Date: Nov. 19, 1998

Related U.S. Application Data

(60) Provisional application No. 60/046,419, filed on May 14, 1997.

(51) Int. Cl.[7] .................................................... G08B 13/14
(52) U.S. Cl. ................... 340/572.4; 340/825.34; 340/825.63
(58) Field of Search .................. 340/572.4, 10.1, 340/825.63, 825.34

(56) References Cited

U.S. PATENT DOCUMENTS 5,451,958   9/1995   Schuermann ............... 342/42

*Primary Examiner*—Thomas Mullen
(74) *Attorney, Agent, or Firm*—David B. Abel, Esq.; Squire, Sanders & Dempsey L.L.P.

(57) ABSTRACT

A reader (10) capable of efficiently reading tags (12) of differing protocols in a radio frequency identification system. The tag may be either a full-duplex tag or a half-duplex tag. The reader includes a display (16), a power switch (18) and a read switch (20) for enabling operation of the reader by a user. The reader further includes a coil (60); a driver circuit (32) coupled to the coil; and a signal analyzing circuit (82, 84, 90) coupled to the coil. The signal analyzing circuit analyzes tag identification signals sensed by the coil by detecting an initial data sequence of the tag identification signals and selecting from at least two different protocols the correct protocol of the tag identification signal.

21 Claims, 3 Drawing Sheets

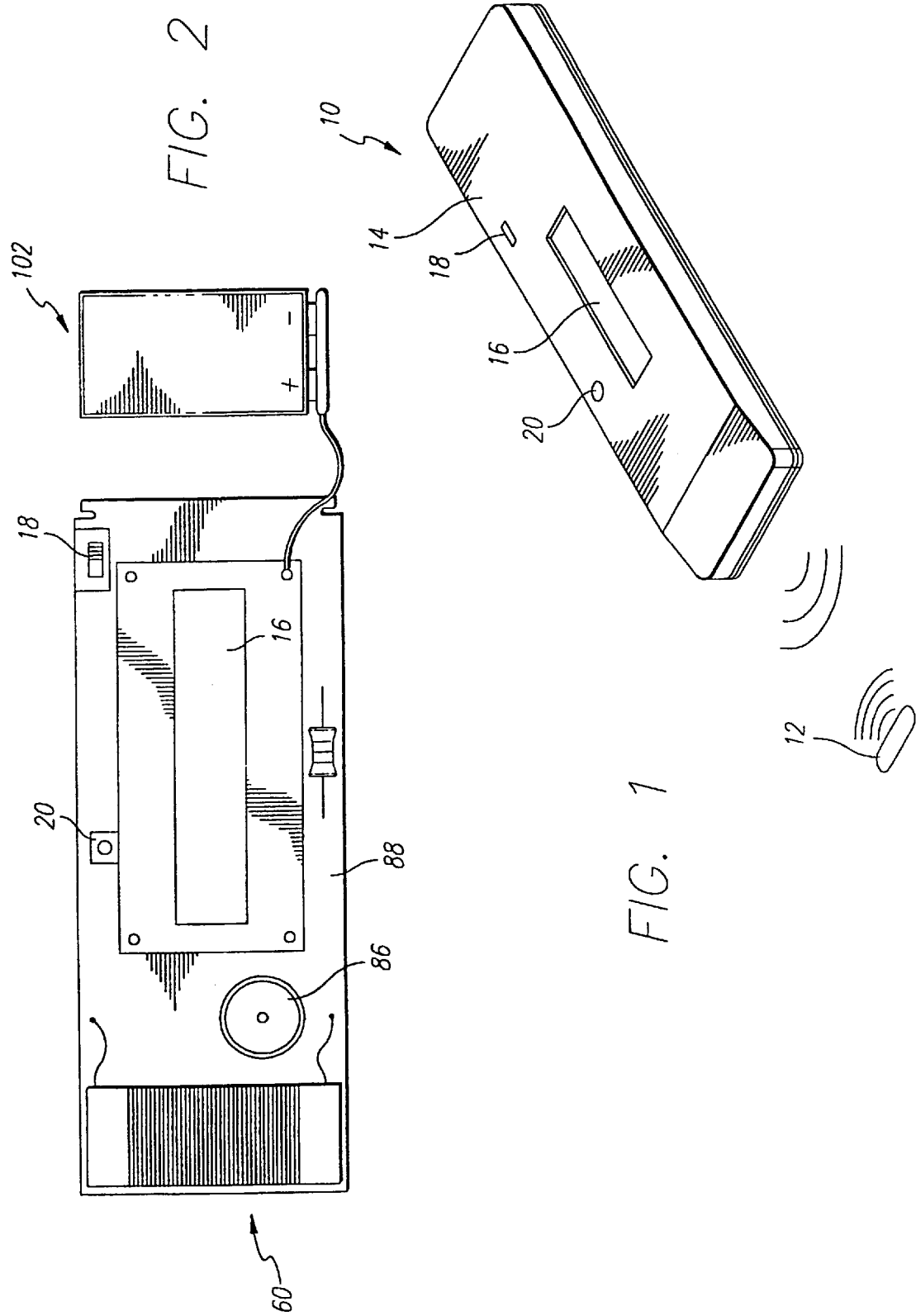

READER FOR RFID SYSTEM

The present application claims the benefit under 35 U.S.C. 119(e) of U.S. Provisional Application Ser No. 60/046,419, filed May 14, 1997.

FIELD OF THE INVENTION

The present invention relates to electronic identification systems. The invention specifically relates to a reader capable of efficiently reading tags of differing protocols in a radio frequency identification system.

BACKGROUND

Identification systems relying on radio frequency-based communication between a reader and a transponder or tag of various types for identifying animals and objects are in use for a number of applications. Generally, identification systems having a tag that generates an identification ("ID") signal simultaneous to its being energized by an electromagnetic field produced by a reader are termed "full-duplex" systems. Alternatively, a "half duplex" identification system utilizes a tag capable of receiving a transmitted "charging" signal which is utilized by the tag to charge a capacitor or power storage element. The stored energy of the capacitor or power storage element can then be used to power the tag and allow the broadcast of a signal from the tag to the reader, which is in a "silent" or non-broadcasting mode. For either of the foregoing identification systems, the tags are very small, although as a general rule a full-duplex tag will be smaller than a half-duplex tag since a power storage element is required in the latter.

The tag for the identification system generally includes a memory element coupled to an antenna such as an inductive coil which facilitates coupling with an inductive power supply. The reader usually includes a battery power supply and a field coil. The coil is driven by driving circuitry that causes the coil to transmit an electromagnetic field to the tag. The field is received by the tag and converted through induction to a direct current power supply signal to run the tag circuitry in a full-duplex tag, or stored in the capacitor of a half-duplex tag. In response to the reader, the tag transmits the identification data to the reader from the tag memory, and the reader can display the data. These identification systems thus permit powering an identification tag transponder by an electromagnetically coupled energizer reader, and the transmission of an ID signal, or modification of the field of the reader coil, by the tag.

Manufacturers have developed a number of different protocols by which readers and transponders communicate the identification data. In order to read the various protocols with a single reader, a need exists for a reader capable of reading multiple tags having differing protocols which minimizes any delay associated with identifying a specific transponder protocol.

SUMMARY OF THE INVENTION

The present invention is directed to a reader for an inductive coupled transponder or tag identification system which provides improved performance, both reading range and reading time, of a reader/transponder system where the transponder may be using more than one transmission protocol or encoding scheme. The present invention also provides a reader with improved performance where the reader and transponder are moving with respect to one another and more than one protocol is used. Further, the present invention provides a reader having a filter circuit and processing system which is self-adjusting to variations in the comparator output characteristics. The comparator output characteristics may change due to changes in the distance from or the configuration of the transponder.

BRIEF DESCRIPTION OF THE DRAWINGS

FIG. 1 is a perspective view of an inductive identification system including a reader and a transponder.

FIG. 2 depicts one side of the internal circuitry of the reader of FIG. 1.

DETAILED DESCRIPTION OF THE PREFERRED EMBODIMENT

Figure 3:
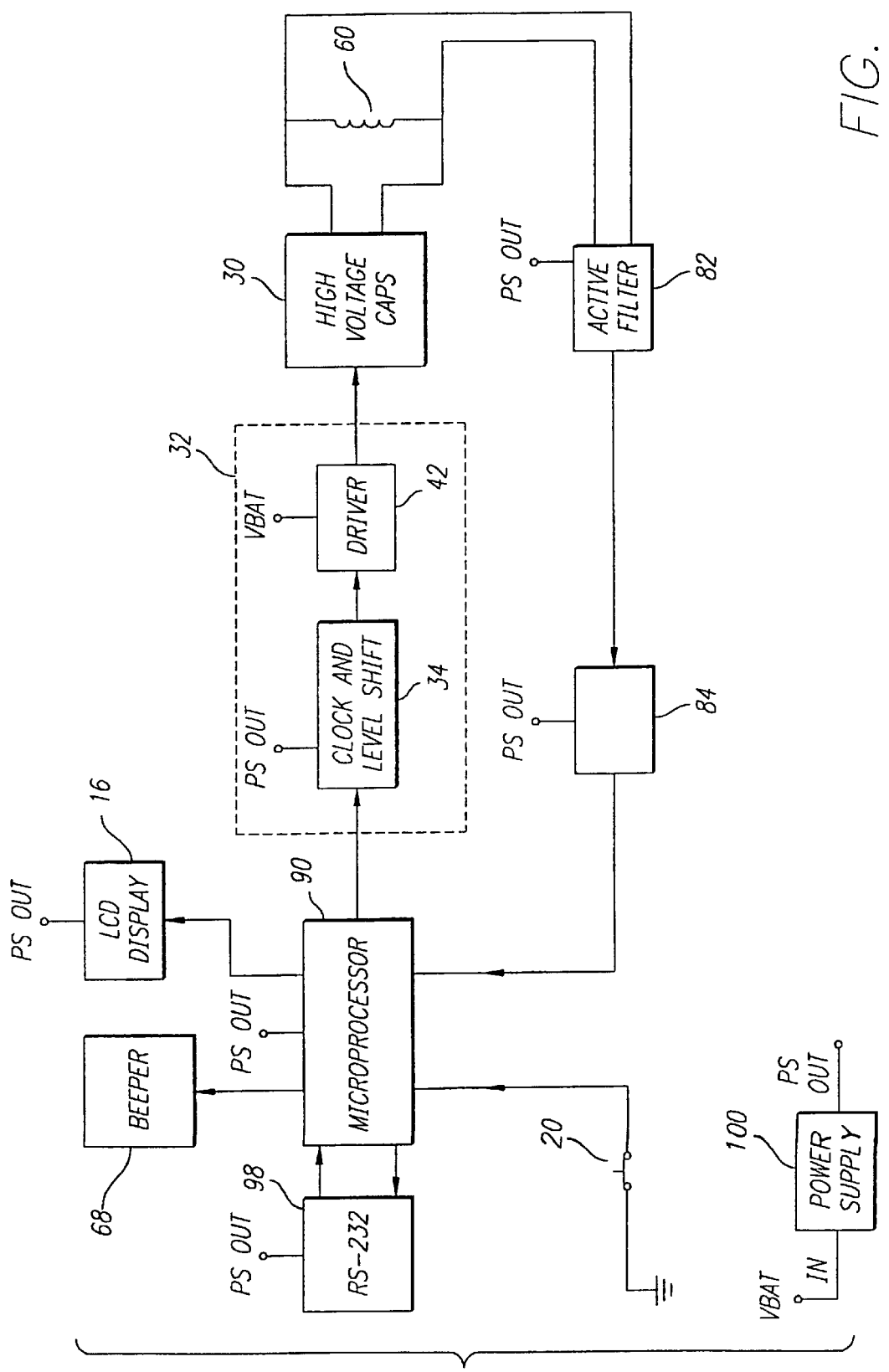
FIG. 3 is a block diagram of an exemplary circuit of the reader of FIG. 1.

FIG. 1 depicts a perspective view of an inductive reader 10 according to the present invention for use in reading an identification signal message or telegram from a transponder or tag 12. The reader 10 includes a case 14, preferably formed from plastic, and a display 16, such as a liquid crystal display. The reader 10 also includes a power switch 18 and a read switch 20.

The tag 12 of FIG. 1 may be either a full-duplex tag or a half-duplex tag as generally known and currently in use in a variety of applications. For purposes of the following description of the reader 10, the particular configuration of the tag 12 is significant to the extent that the tag 12 includes a coil or antenna (not shown) operative with the reader 10, and the signal generated thereby, more significantly for purposes of the present invention, the tag 12 may be capable of generating either or both of a phase, frequency or amplitude modulated signal which the reader 10 can identify and decode the identification signal.

There are a variety of ways in which the reader and tag can modulate their respective carriers with data. Two methods of modulating a carrier are phase shift keying ("PSK") and frequency shift keying ("FSK"), the names of which indicate the carrier parameter that is modulated. The tag 12 transmits an FSK or PSK signal by utilizing a waveform generator and a microprocessor. A PSK tag transmits data to the reader by modulating a carrier. The tag creates a modulated carrier with a frequency the same as or different from the frequency of the reader's carrier.

As shown in FIG. 2, a coil 60 is positioned proximate one end of the reader 10, and attached to a main circuit board 88. The display 16 is also mounted on the circuit board 88, as is a piezoelectric tone generator 86, which emits a tone upon activation, and to confirm that a tag has been read.

FIG. 3 depicts a representative signal transmission and tag reader circuit for the reader 10, although it is to be understood that other equivalent systems and circuitry could be substituted. In FIG. 3, the circuit of the reader 10 is shown in a block diagram. The circuit of the reader 10 includes a coil circuit 30 coupled to a coil driver circuit 32. The coil driver circuit 32 may include a clock/level shift 34 producing regular reoccurring pulses in a drive signal on an output line to the coil circuit 30 at a transmission frequency F(t). The drive signal may be a sine wave, triangle wave, square wave, or other waveform with a pulse time or period corresponding to a desired transmission frequency. The transmission frequency is determined by a microprocessor 90 that provides a signal on an input to the clock and level shift 34 of the coil driver circuit 32.
}

The drive signal from the clock and level shift 34 is provided to a driver 42 within the coil driver circuit 32. The driver typically includes a positive driver which outputs the waveform at zero degrees (0°) and a negative driver which outputs the same signal inverted or shifted one hundred eighty degrees (180°). Thus, the driver 42 transforms the drive signal into first and second complementary pulse trains. The pulse trains are amplified by amplifiers and then coupled to the primary coil circuit 30.

The primary coil circuit 30 may include complimentary capacitor circuits coupled to receive the pulse trains from the driver 42. The capacitors are coupled in turn to opposite ends of a coil 60, so that each input of the coil 60 is coupled to one of the pulse trains through a separate capacitor circuit. The coil 60 produces a time-varying electromagnetic field when excited by the pulse trains. The electromagnetic field propagates in three-dimensional space around the coil 60. As discussed above, the tag 12 includes a receiving coil (not shown) which receives and induces a tag power supply voltage from the electromagnetic field generated by the coil 60. The tag 12 also includes a memory and other circuitry for providing an identification signal by variably loading or energizing the receiving coil of the tag 12 reflecting data output from the memory with either a phase shift key (PSK) or frequency shift key (FSK) modulated signal, which carries the identification information.

The identification signal from the tag 12 is sensed by the coil 60 of the reader 10, in that the voltage across the coil 60 will be modulated in accordance with the code sequence programmed into the tag 12. The identification signal sensed by the coil 60 is first routed to and conditioned by the filter 82, then passed to an envelope detection and comparator circuit 84. The comparator circuit 84 produces a variable-width pulse train which has characteristics corresponding to the PSK or FSK protocol being received by the coil 60 from the particular tag 12. The comparator circuit 84 thus produces a pulse train for either amplitude or phase modulated sub-carriers in the received signal, which is sent to a microprocessor or central processing unit ("CPU") 90 for processing and decoding.

Figure 4:
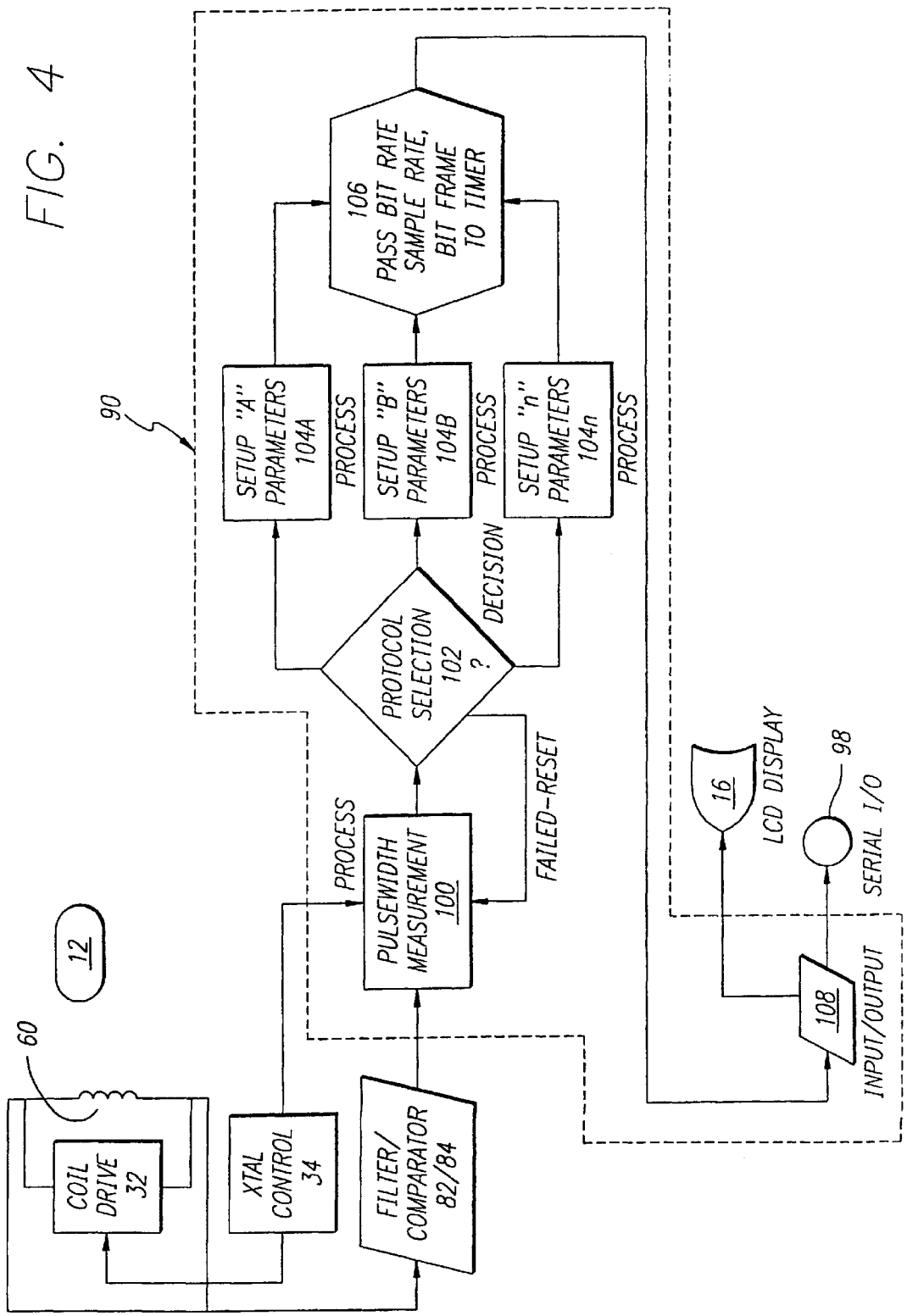
FIG. 4 is a flow chart for the software programmed into the microprocessor of the reader of the present invention.

A simplified system block diagram and the logic of the software of the CPU 90 is depicted in FIG. 4. As depicted therein, the signal from the tag 12 is obtained by the coil 60 and processed by the filter 82 and comparator circuit 84, which produces the pulse train forwarded to the CPU 90.

In the CPU 90, as illustrated by the "pulse-width measurement" box 100, the output of the comparator is first processed by measuring the pulse width. The pulse widths are measured in terms of the number of cycles of the driver signal. The CPU then determines the timer interval in the "protocol selection" box 102 by selecting the most likely protocol based on how much deviation there is from known ideal pulse width stored in the CPU 90.

Based on the selection of the most likely protocol, the protocol selected, the CPU 90 configures itself to setup for the selected protocol "A" or "B" ... "n", in the respective "setup 'n' parameters" process blocks 104A, 104B ... 104n. Therein, upon the detection of a pulse of acceptable width a correction value is calculated as the variance from the ideal pulse width for the selected most likely protocol. This allows the system to identify the time where the center of the ideal pulse occurred. An adjustment then compensates for comparator output signal changes due to noise or transponder signal strength. Also, a sampling rate of the comparator output signal is selected based on the requirements of the identified protocol. The CPU 90 can then identify what the sampled signal levels would have been, knowing only the pulse used to select the protocol and the associated sampling rate.

Depending upon which protocol is being received and which setup is selected, parameters such as the sampling rate, bit frame length and number of bits for the protocol are configured for processing in box 106. The configured data stream from box 106 is continuously sent to and processed in the "collect data and decode" box 108.

Further, since the sampling rates for different protocols may be different, reconstructed samples representing one or more bits of data originally encoded into the transponder transmission are added to the beginning of the configured data stream in box 108. Sampling of the comparator output signal continues according to the requirements of the protocol and it is converted into binary data. The decoding rules for the selected protocol are enforced during the receipt of the transponder transmission.

Thus, in box 108, the full data stream is collected, decoded if necessary, and a process cyclic redundancy check ("CRC") verifies the data, to thereby determine the unique identification number of the tag 12. The detected number is then output from the CPU 90 to the LCD display 16 and/or the serial input/output 98 of the reader 10.

By using the processing approach described herein, any one of the "n" programmed protocols can be detected, read and validated within a single pass of the received tag data, this is because the initial information, which may be part of the synchronization pattern, is not lost. In addition, the system provides the ability to avoid multiple passes on the received tag data, providing faster initial reading and increased speed of transponder to reader interfacing. Further, since the initial bits are simulated or used after the protocol is selected, there is no need to poll each protocol in turn, again allowing a single pass read.

Some tag protocols require processing of the variable width pulse train from the comparator circuit 84 after it has been received in its entirety—for example decryption prior to CRC checking, this processing is done during and within the time needed for reading of the next identification signal data stream, and by using alternating buffers for collecting the digital data. This allows back-to-back reception and decoding of changing tag protocols, even if they are different protocols.

The CPU 90 thus includes decoding and display circuitry and/or software to translate the identification signal into usable data according to a predetermined format for information retrieval or transmission purposes. As depicted in FIGS. 3 and 4, the CPU 90 is also coupled to an audible beeper circuit 68 to indicate a successful or unsuccessful read of the tag 12. The CPU drives the display 16 which is preferably a commercially available alphanumeric dot matrix liquid crystal display ("LCD") or similar device, for example a one-line by sixteen-character alpha-numeric display. As an optional accessory, the reader 10 can include an input/output ("I/O") interface 98 to an external device (not shown), such as a conventional RS-232 serial interface. The reader 10 can be powered by a conventional regulated direct current ("DC") power supply 100, preferably using a battery as an input current source or an external D.C. supply.

The CPU 90 can be programmed to read half-duplex ("HDX") and full-duplex ("FDX") tags. Both types of tags may be read by programming the CPU 90 to pause prior to processing the signal. FDX tags are, nevertheless, read because they respond immediately to the driven signal. The modulated signal will be processed following the pause. The pause allows HDX tags to receive and convert the charging signal to power for the tag 12. The HDX tag will then respond. The modulated signal is then processed by the CPU 90 as described above.

Having thus described a preferred embodiment of a reader for an inductive coupled tag identification system, it should be apparent to those skilled in the art that certain advantages of the within system have been achieved. It should also be appreciated that various modifications, adaptations, and alternative embodiments thereof may be made within the scope and spirit of the present invention.

What is claimed is:

1. A reader for an identification system capable of reading the tag identification signals of identification tags having different output protocols, the reader comprising:

a coil;

a driver circuit coupled to said coil;

a signal analyzing circuit coupled to said coil to obtain and analyze tag identification signals sensed by said coil and output a corresponding pulse train;

a means for converting said pulse train into a data sequence; and means for detecting an initial data sequence of the tag identification signals and for selecting from at least two different protocols the correct protocol of the tag identification signal being sensed by the reader based upon the initial data sequence of the tag identification signal.

2. The reader of claim 1, further comprising:

means for measuring the width of a pulse of said pulse train output by said signal analyzing circuit, said pulse train representing a time varying field sensed by said coil including data indicative of the tag identification signal;

means for storing a plurality of protocol options; and means for selecting from said plurality of protocol options the protocol required for processing said pulse train to obtain useable identification data based on the width of the measured pulse.

3. The reader of claim 1, wherein the means for detecting and selecting further comprises:

means for sampling pulses from an initially received portion of said pulse train and for determining the protocol required to process the remainder of said pulse train to obtain data;

means for processing said remainder of said pulse train according to the required protocol to obtain data;

means for determining the data represented by said sampled pulses; and means for combining the data represented by said sampled pulses with said data obtained by processing said remainder of said pulse train.

4. The reader of claim 1, wherein the means for detecting and sampling further comprises:

means for compiling data determined from a sampled set of pulses of said pulse train output by said signal analyzing circuit with data determined from applying a selected protocol to all remaining pulses of said pulse train subsequent to said sampled set of pulses, to thereby obtain all of said data from said pulse train upon receiving the entirety of said pulse train.

5. The reader of claim 4, wherein the means for detecting and sampling further comprises:

means for verifying the compiled data utilizing a process cyclic redundancy check.

6. The reader of claim 1, wherein the means for detecting and sampling further comprises:

means for detecting, reading and validating the tag identification signal upon a single receipt of the tag identification signal.

7. The reader of claim 1, wherein the means for detecting and sampling further comprises:

means for storing in a buffer an entire pulse train which represents a complete tag identification signal; and means for processing said entire pulse train stored in said buffer to obtain a data signal.

8. The reader of claim 1, wherein the means for detecting and sampling further comprises:

means for compiling data determined from a sampled set of pulses of said pulse train with data determined from applying a selected protocol to all remaining pulses of said pulse train subsequent to said sampled set of pulses, to obtain all of said data from said pulse train upon receiving the entirety of said pulse train;

means for storing in a buffer one of said pulse trains representing a complete tag identification signal; and means for processing said pulse train stored in said buffer.

9. A reader capable of reading tag identification signals of identification tags having different output protocols, the reader comprising:

a coil;

a driver circuit coupled to said coil;

a signal analyzing circuit coupled to said coil to obtain and analyze tag identification signals sensed by said coil to output a pulse train representing said tag identification signal as a data sequence;

a detector to detect an initial data sequence of the tag identification signal and determine the protocol for processing the entire data sequence;

a memory for storing at least two different protocol options for use in processing the data sequence to decode the tag identification signals; and a processor, coupled to said detector and said memory, to select from said memory the protocol for processing the data sequence determined by said detector, and to process the data sequence utilizing the selected protocol to decode the tag identification signal being received by the reader.

10. The reader for the tag identification system of claim 9, wherein the detector further comprises:

a pulse width measuring circuit to measure the width of a pulse of said pulse train.

11. The reader for the tag identification system of claim 9, wherein the detector further comprises:

a sampling circuit to sample pulses from an initially received portion of said pulse train to determine the protocol required to process the remainder of said pulse train to obtain data; and a sampled pulses processing circuit to determine the data represented by said sampled pulses according to the selected protocol processing requirements.

12. The reader for the tag identification system of claim 11, wherein the processor processes said remainder of said pulse train according to the required protocol to obtain data and combines the data represented by said sampled pulses determined by said sampled pulses processing circuit with said data obtained by processing said remainder of said pulse train.

13. The reader for the tag identification system of claim 9, wherein the processor compiles data determined from a sampled set of pulses of said pulse train with data determined from applying a selected protocol to all pulses of said pulse train subsequent to said sampled set of pulses, to obtain all of said data from said pulse train upon receiving the entirety of said pulse train.

14. The reader for the tag identification system of claim 13, wherein the processor verifies said compiled data utilizing a process cyclic redundancy check.

15. The reader for the tag identification system of claim 9, wherein said reader detects, reads and validates the tag identification signal upon a single receipt of the received tag data.

16. The reader for the tag identification system of claim 9, further comprising:

a buffer for receiving and storing as data an entire pulse train representing a complete tag identification signal; and a sequencer to cause said buffer to output stored data to said processor to allow said processor to process said entire pulse train stored in said buffer to obtain a data signal.

17. The reader for the tag identification system of claim 9, wherein the processor compiles data determined from a sampled set of pulses of said pulse train with data determined from applying a selected protocol to all pulses of said pulse train subsequent to said sampled set of pulses, to obtain all of said data from said pulse train upon receiving the entirety of said pulse train.

18. A method for reading a radio frequency identification signal comprising:

providing a reader having a coil, a driver circuit coupled to said coil, and signal analyzing and processing circuitry coupled to said coil to obtain, analyze and process radio frequency identification signals sensed by said coil; and programming said signal analyzing and processing circuitry to cause it to sample an initial data sequence of the identification signal and determine the protocol for processing the entire data sequence;

selecting the correct protocol for processing the data sequence; and processing the data sequence using the selected protocol to obtain a reading of the radio frequency identification signal.

19. The method of claim 18, further comprising:

detecting, reading and validating the identification signal upon a single receipt of the received identification signal.

20. The method of claim 18, further comprising:

measuring the width of a pulse of a pulse train output by said signal analyzing circuit, said pulse train being representative of a time varying field sensed by said coil indicative of the identification signal;

storing a plurality of protocol options in a memory; and selecting from said plurality of protocol options the protocol required for processing said pulse train to obtain useable identification data.

21. The method of claim 18, further comprising:

determining the data represented by said sampled initial data; and combining the data represented by said sampled initial data with said data obtained by processing the remainder of said data sequence to obtain a complete identification signal.

* * * * *